Dec. 5, 1939.         J. D. MALMQVIST         2,182,298
                  METHOD OF MEASURING GRAVITY
                     Filed Feb. 8, 1938
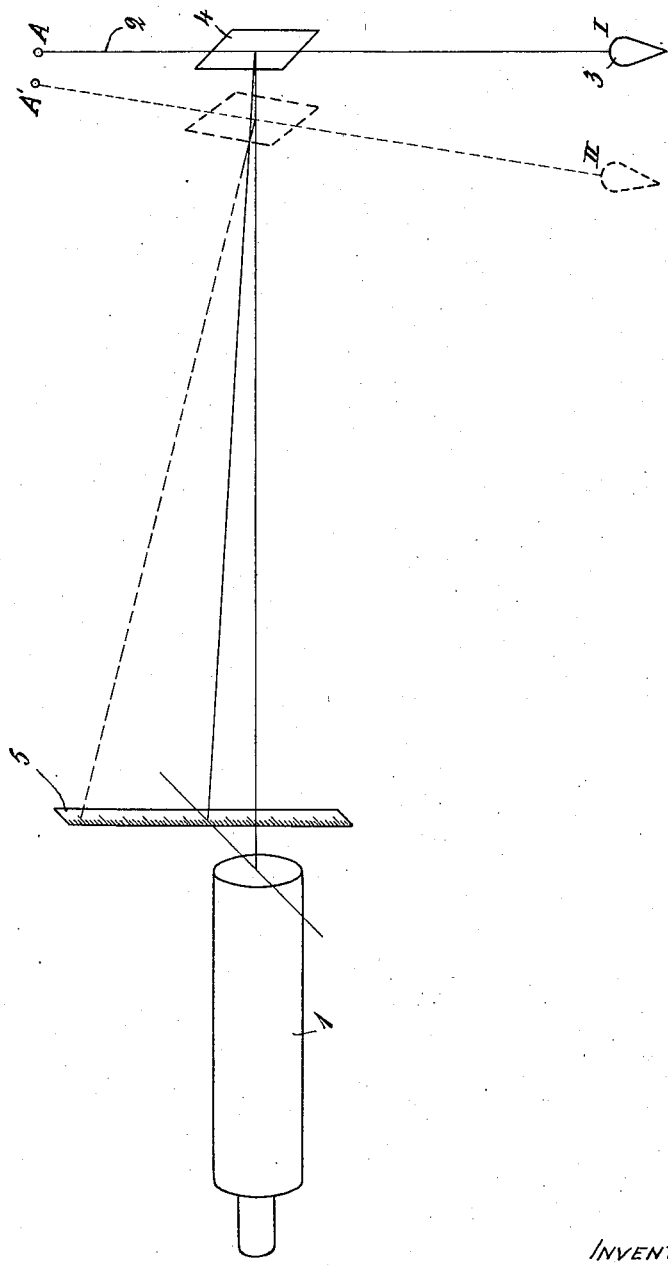
INVENTOR
JOHAN DAVID MALMQVIST
By Richard K. Stevens
                ATTORNEY Patented Dec. 5, 1939

2,182,298

UNITED STATES PATENT OFFICE

2,182,298

METHOD OF MEASURING GRAVITY

Johan David Malmqvist, Boliden, Sweden, assignor to Bolidens Gruvaktiebolag, Stockholm, Sweden, a joint-stock company limited of Sweden Application February 8, 1938, Serial No. 189,455
In Sweden March 19, 1937

1 Claim. (Cl. 265—1.4)

It has been known of old that a freely suspended plummet does not always point towards the centre of the earth but that small deviations from the normal perpendicular occur. These deviations, which have been termed plummet deviations, are due to relatively superficial irregularities in the crust of the earth, such as topographical conditions of the country, heterogeneous distribution of rocks or minerals with different specific gravity.

The present invention relates to a method and a device intended for the same, by means of which relative plummet deviations are determined in order to be able thereby to ascertain the presence of ores, other useful minerals and other subterrestrial deposits.

In determining the plummet deviation it is also intended to obtain supplementary or completive information on measurements of forces of gravitation where relative changes in the vertical component of the field of the force of gravitation have been measured. By simultaneously determining the relative plummet deviation it is, as a matter of fact, also possible to compute the change in the horizontal component of the field of the force of gravitation, by which means the position and form of the ores or, on the whole, those of the disturbing bodies can be more exactly determined.

Previously the plummet deviation has for geodetic purposes been determined with very accurate and precise theodolites, the angular separation between a fixed star and the plumb line at the point of observation then having been determined at a certain fixed moment of time. In these cases it was possible to determine the absolute plummet deviation. In the present case, only the relative plummet deviation is of interest, i. e., the angular separation in the plumb line between two or more adjacent points on the surface of the earth.

The method of determining relative plummet deviations according to the present invention is described in the ensuing as an example with reference to the accompanying diagrammatic drawing.

A telescope 1 is directed towards a mirror 4 suspended from a point A by a cord 2 to which a plummet or weight 3 is attached, the mirror being placed in the same horizontal plane as the optical axis of the telescope. The reflected image of the vertical scale 5 placed beside the telescope is sharply set in the telescope, and the scale is read off at the point where it is intersected by a hair-cross provided in the ocular of the telescope, this hair-cross having been sharply set. This reading is obtained at mirror-position I. Supposing the mirror together with the plummet is removed to another point of suspension A' having another plumb line position II, shown with dashed lines, while the telescope is retained in the same position, and the same procedure is carried out anew, a second reading is obtained on the scale as indicated by the dotted ray line. From the two readings the angular separation between the plumb lines of the points of observation can be calculated if the distance between the telescope and the points in question is known. The measurement may be performed along a longer or shorter profile line, and the relative plummet deviations between all the points of observation along the profile may be determined.

The method of measurement can be arranged in several different ways. For example, the scale 5 may be exchanged for a light signal whose reflected image is set in the telescope and whose position is read off on an ocular scale focussed in. Furthermore, the mirror may be exchanged for a prism which magnifies the angle of deflection between the incident and the reflected light ray.

In order to preclude the influences caused by wind and the like the mirror 4 and the plummet 3 are placed in a tube or casing provided with a sight glass. Both mirror and plummet are locked during each change of position. Influences by jars are reduced by air damping the suspension device. If required, the vessel in which the mirror and the plummet are housed, is temperature-regulated. Both telescope and scale as well as the mirror and plummet may, if desired, be encased in an evacuated and temperature-regulated tube in order to preclude influences caused by air refraction.

The procedure may also be modified in such a way that the image of a fixed object is reflected and refracted by means of a prism attached to the suspension wire of the plummet, into a telescope in which the position may be determined.

Having thus described my invention, I declare that what I claim is:

A method of locating and determining the extent of ores or the like by measuring relative plummet deflections that are effected by the horizontal components of gravitational force that comprises the steps of fixedly locating a telescope having a scale associated therewith, and positioning a plummet having a reflective surface thereon for playing upon said scale, at selected points over the terrain under observation, while maintaining said telescope in fixed position, noting the variation in the deflection of the plummet as manifested on said scale while the plummet is located at each test station, and utilizing the variations in the plummet deflection as an index of the subsurface formations.

JOHAN DAVID MALMQVIST.